(12) United States Patent
Wang et al.

(10) Patent No.: US 9,916,852 B2
(45) Date of Patent: Mar. 13, 2018

(54) OPTICAL TAPE WITH AN INCREASED TRACK PITCH FOR IMPROVEMENT OF TRACKING PERFORMANCE AFTER SEAM

(71) Applicant: Oracle International Corporation, Redwood City, CA (US)

(72) Inventors: Lingtao Wang, Superior, CO (US); Scott Wilson, Thornton, CO (US); Dwayne Edling, Mead, CO (US); Faramarz Mahnad, Brookline, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/183,036

(22) Filed: Jun. 15, 2016

(65) Prior Publication Data
US 2017/0365290 A1   Dec. 21, 2017

(51) Int. Cl.
| | | |
|---|---|---|
| *G11B 7/24* | (2013.01) | |
| *G11B 7/24097* | (2013.01) | |
| *G11B 7/24079* | (2013.01) | |
| *G11B 7/26* | (2006.01) | |
| *G11B 7/007* | (2006.01) | |
| *G11B 7/003* | (2006.01) | |
| *G11B 7/24009* | (2013.01) | |

(52) U.S. Cl.
CPC ...... *G11B 7/24097* (2013.01); *G11B 7/24079* (2013.01); *G11B 7/263* (2013.01); *G11B 7/003* (2013.01); *G11B 7/0031* (2013.01); *G11B 7/0079* (2013.01); *G11B 7/00745* (2013.01); *G11B 7/24* (2013.01); *G11B 7/24009* (2013.01); *G11B 2007/00754* (2013.01); *G11B 2007/240017* (2013.01)

(58) Field of Classification Search
None
See application file for complete search history.

(56) References Cited

U.S. PATENT DOCUMENTS

| | | | | |
|---|---|---|---|---|
| 4,357,638 A | * | 11/1982 | Yoshimaru | G06K 17/0019 360/49 |
| 4,498,107 A | * | 2/1985 | Yoshimaru | G06K 17/0019 348/96 |
| 5,544,133 A | * | 8/1996 | Sin | G11B 11/10502 360/134 |
| 5,696,755 A | * | 12/1997 | Leonhardt | G11B 5/00817 369/275.5 |
| 5,802,033 A | * | 9/1998 | Van Rosmalen | G11B 7/003 369/14 |

(Continued)

FOREIGN PATENT DOCUMENTS

WO      2007/092785 A2     8/2007

*Primary Examiner* — Tan X Dinh
(74) *Attorney, Agent, or Firm* — Invoke

(57) ABSTRACT

In at least one embodiment, an optical data storage tape is provided. The optical data storage tape includes a read/write data area including a plurality of writeable tracks for storing data thereon, each writeable track having a first track width. The optical data storage tape further includes a seam area positioned proximate to the read/write data area. The seam area including a plurality of non-writeable tracks, each non-writeable track including a second track width that is greater than the first track width for each writeable track.

10 Claims, 4 Drawing Sheets

(56) References Cited

U.S. PATENT DOCUMENTS

| | | | |
|---|---|---|---|
| 6,968,117 B2 * | 11/2005 | Jinnai | G11B 27/105 358/909.1 |
| 8,771,572 B2 | 7/2014 | Mahnad et al. | |
| 8,790,561 B2 | 7/2014 | Mahnad et al. | |
| 9,009,745 B2 * | 4/2015 | Janssen | G11B 15/32 226/190 |
| 9,168,707 B2 | 10/2015 | Mahnad et al. | |
| 2003/0193845 A1 * | 10/2003 | Sano | G11B 5/584 369/13.11 |
| 2010/0136151 A1 * | 6/2010 | Mahnad | G11B 5/584 425/3 |
| 2011/0141868 A1 * | 6/2011 | Mahnad | G11B 7/14 369/53.2 |
| 2013/0019766 A1 * | 1/2013 | Mahnad | B29C 59/02 101/22 |
| 2013/0106015 A1 | 5/2013 | Mahnad et al. | |
| 2015/0255107 A1 | 9/2015 | Matsui et al. | |
| 2016/0346961 A1 * | 12/2016 | Mahnad | B29C 43/46 |

* cited by examiner

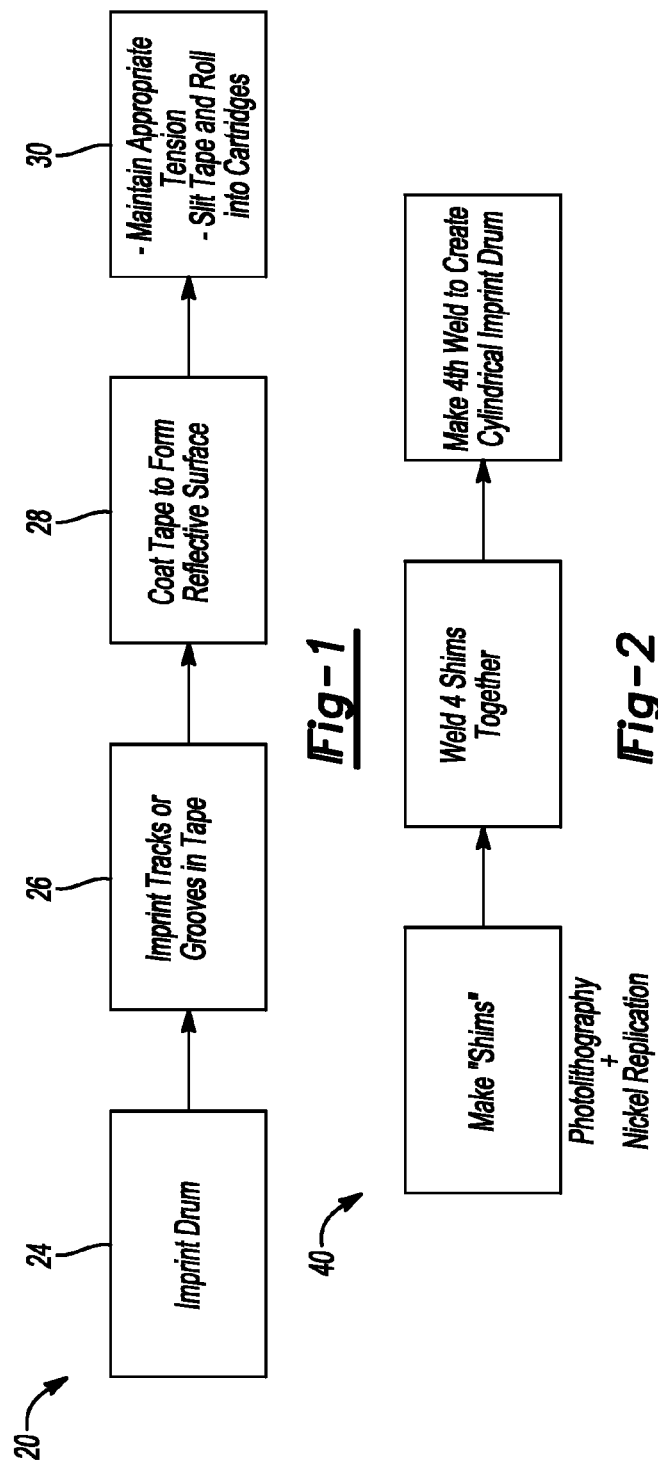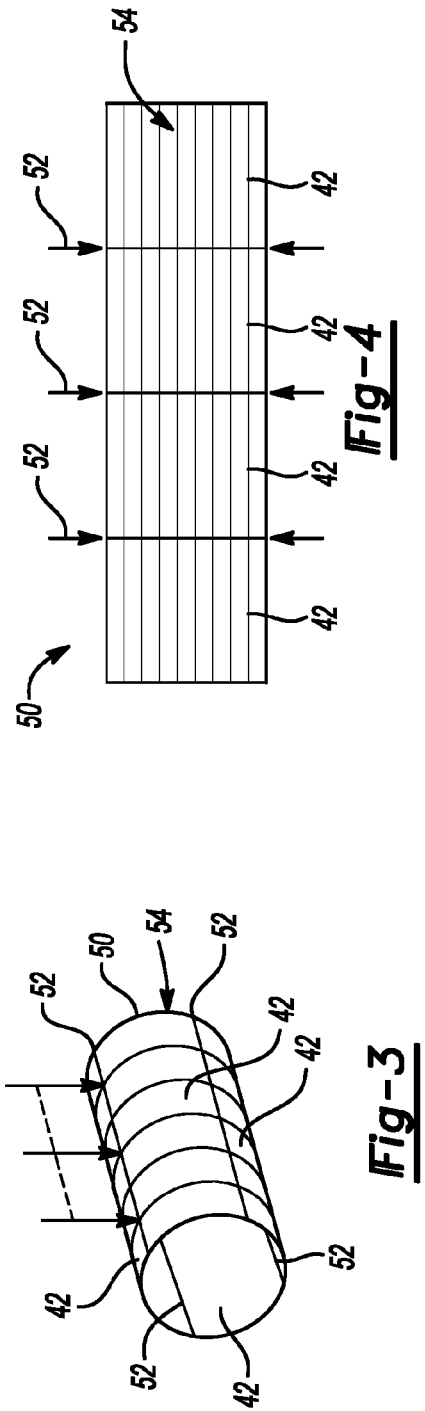

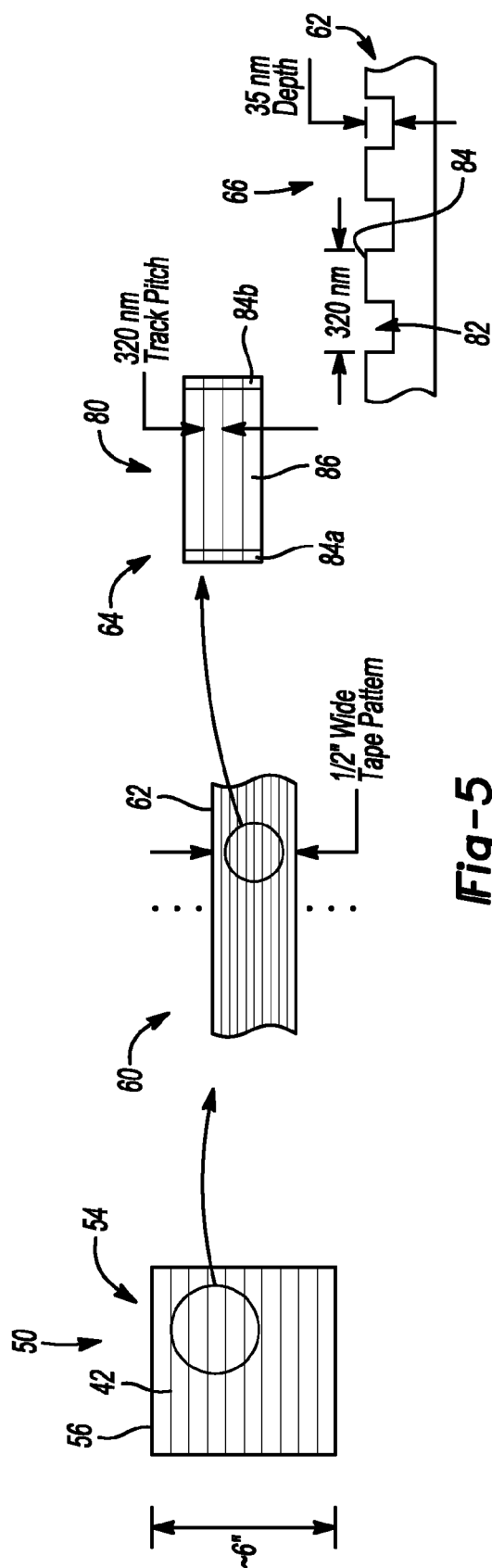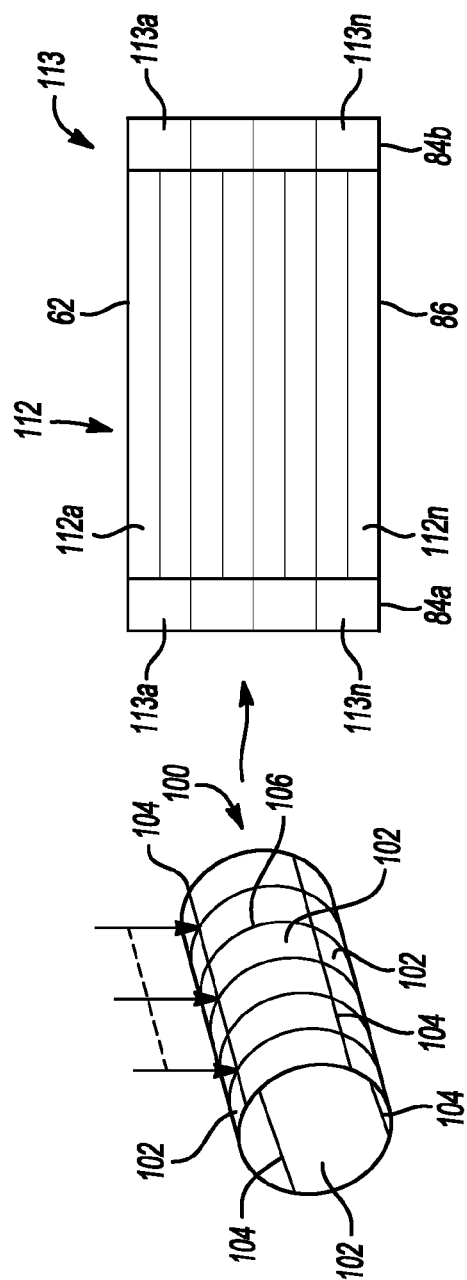

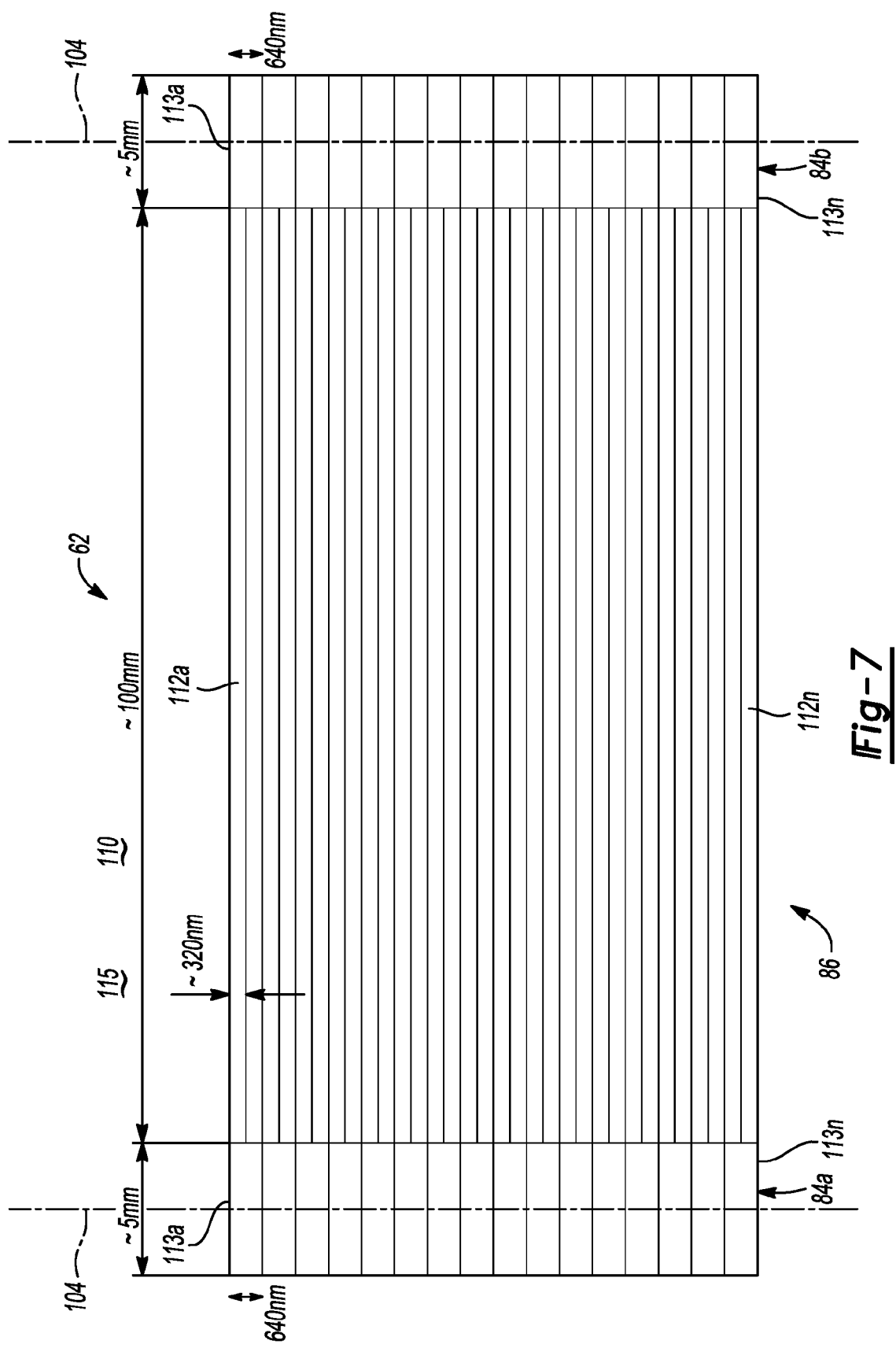

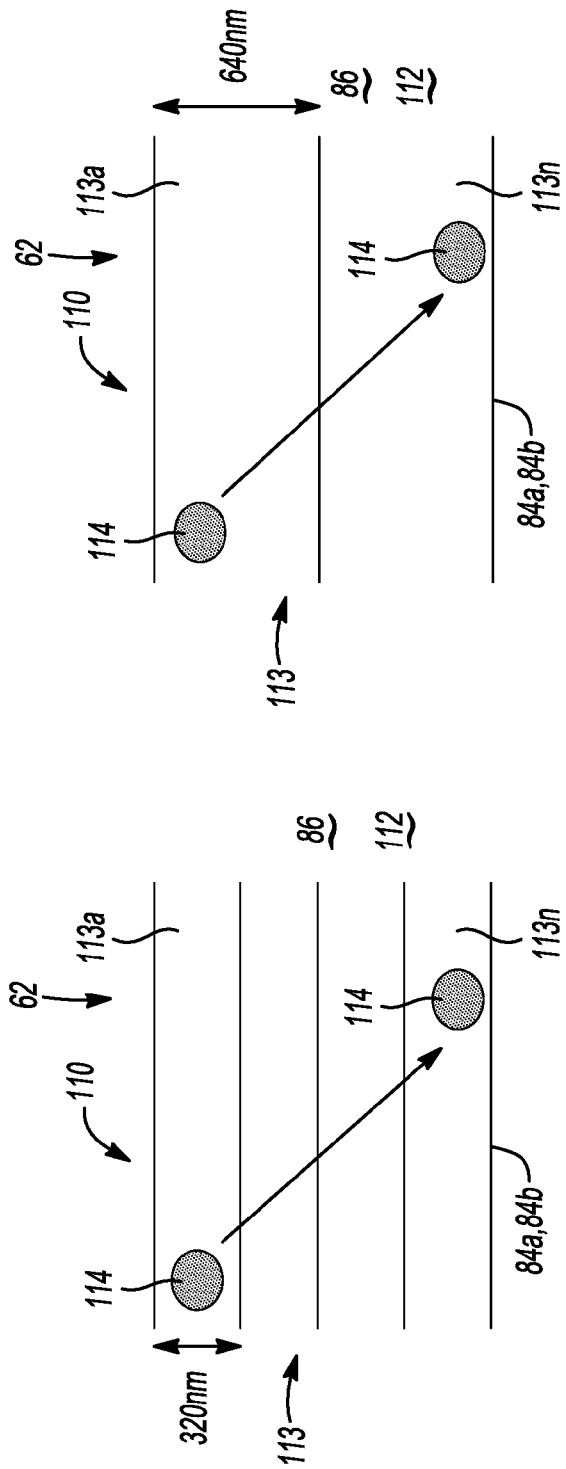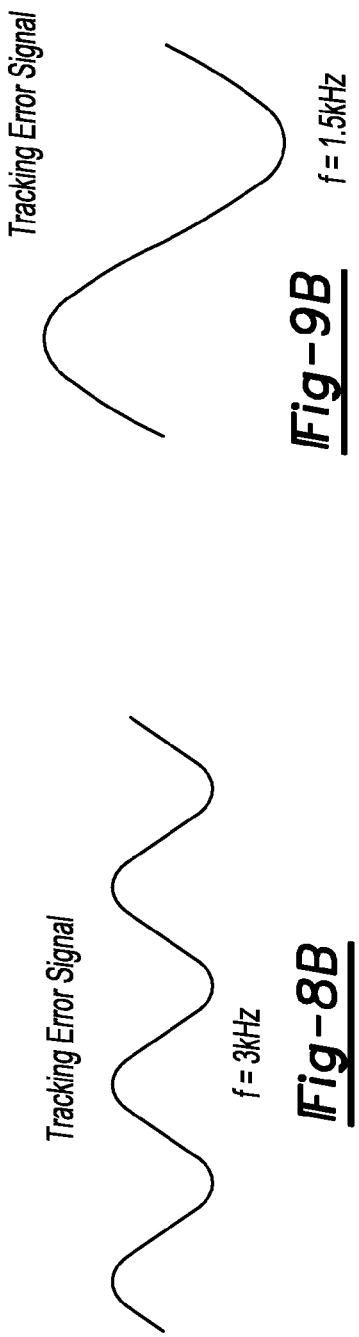

OPTICAL TAPE WITH AN INCREASED TRACK PITCH FOR IMPROVEMENT OF TRACKING PERFORMANCE AFTER SEAM

TECHNICAL FIELD

Aspects disclosed herein generally relate to an optical tape including an increased track pitch for improvement of performance after seam. These aspects and others will be discussed in more detail herein.

BACKGROUND

Within the process of optical tape fabrication, the optical tape is fabricated by imprinting a track pattern from a circular drum structure with four sections of shims. A joint area between two of the sections of the shims may produce a mirror area on the optical tape with no track pattern which is generally defined as a seam area. Therefore, a servo system may re-acquire focus and tracking after each seam area (or after each seam jump). During the tracking acquire operation after the seam jump, the servo system may actuate an optical pick unit (OPU) based on a tracking error signal (TES) to follow a track pitch on the optical tape. However, due to a precision limitation during the fabrication of an embosser drum (or drum), the drum includes an angular misalignment between two adjacent shims. Such an angular misalignment between the two adjacent shims is generally defined as a track wandering effect. The track wandering effect may cause a relative lateral motion between the OPU and the track pitch after the seam jump and produce an additional TES based on the linear velocity of the tape, an angle of the track wandering, and a width of the track pitch. Therefore, a frequency of the TES due to the track wandering may exceed a limit of the bandwidth of the servo system when the linear velocity is above a certain level. Thus, the track wandering effect may limit the linear velocity of the optical tape.

SUMMARY

In at least one embodiment, an optical data storage tape is provided. The optical data storage tape includes a read/write data area including a plurality of writeable tracks for storing data thereon, each writeable track including a first track width. The optical data storage tape further includes a seam area positioned proximate to the read/write data area. The seam area including a plurality of non-writeable tracks, each non-writeable track including a second track width that is greater than the first track width for each writeable track.

In at least another embodiment, an optical data storage tape is provided. The optical data storage tape includes a read/write data area including a plurality of writeable tracks for storing data thereon. Each writeable track includes a first track width. The optical data storage tape further includes a pre-seam area positioned on a first side of the read/write data area including a plurality of first non-writeable tracks, each first non-writeable track including a second track width. The optical data storage tape further includes a post-seam area positioned on a second side of the read/write data area include a plurality of second non-writeable track, each second non-writeable track including a third track width. Each of the second track width and the third track width are different from the first track width.

In at least another embodiment, an apparatus including an embosser drum is provided. The embosser drum is configured to imprint a nanostructure pattern onto an exterior of an optical data storage tape that forms: (i) a read/write data area including a plurality of writeable tracks for storing data thereon, each writeable track including a first track width, and (ii) a seam area positioned proximate to the read/write data area. The seam area includes a plurality of non-writeable tracks, each non-writeable track including a second track width that is greater than the first track width for each writeable track.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 1 generally depicts a method for fabricating an optical tape;

FIG. 2 generally depicts a method for producing a drum that is used to emboss or imprint the optical tape;

FIG. 3 generally depicts a plurality of shims that are rolled and coupled to one another to form the drum;

FIG. 4 generally depicts a plurality of shims that form the drum and corresponding seams that are formed when the shims are coupled to one another;

FIG. 5 generally illustrates various characteristics of the shim and the optical tape;

FIG. 6 depicts a drum that is used to increase a track width of the optical tape in accordance to one embodiment;

FIG. 7 generally illustrates a top (or front) view of the optical tape in accordance to one embodiment;

FIG. 8A generally illustrates a tracking servo system moving over a pre/post seam area of the optical tape when the track width for each of the tracks in the seam area is 320 nm;

FIG. 8B generally illustrates a corresponding tracking error signal for the tracking servo system and a frequency of a tracking error signal for the tracking servo system as discussed in connection with FIG. 8A;

FIG. 9A generally illustrates the tracking servo system moving over the pre/post seam area of the optical tape when the track width for each of the tracks in the seam area is 640 nm in accordance to one embodiment; and FIG. 9B generally illustrates a corresponding tracking error signal for the tracking servo system and a frequency of the tracking error signal for the tracking servo system as discussed in connection with FIG. 9A.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices may be configured to execute a computer-program that is embodied in a non-transitory computer readable medium that is programmed to perform any number of the functions as disclosed.

To achieve a high linear velocity for an optical tape for a fast read/write speed, aspects disclosed herein provide, but not limited to, a track pitch pattern to improve tracking performance after a seam jump (or seam area) is encountered on the optical tape. Due to a fixed angular misalignment between two adjacent shims that at least partially form a drum that embosses the optical tape, the frequency of the tracking error signal ("TES") due to a track wandering effect on the optical tape is inversely proportional to a width of the track. Therefore, the frequency of the TES may be reduced by increasing a width of the track on the optical tape when the angular misalignment and linear velocity of the optical tape are constant as the tape moves longitudinally during a read/write operation. Additionally, the optical tape may be arranged to include wider track pitch areas at a predetermined length before and after the seam area on the optical tape to maintain a similar amount of data on the optical tape when compared to conventional optical tape configurations.

In general, storage capacity and read/write speed are two aspects that require consideration for any storage system. Varied track pitches may increase an operating running speed of the optical tape drive by at least two times what is generally provided by conventional implementations. This condition may result in an increase of the read/write speed of the tape drive. In addition, the increased width track pitches may not reduce the storage capacity on the optical tape by only utilizing a widening track pitch with a length of only 1-2 mm before the seam on the optical tape.

FIG. 1 generally depicts a method 20 for fabricating an optical tape. An embossing drum (or drum) is provided that rotates about its central axis for receiving the optical tape while preformatting the optical tape. At 24, the drum is imprinted with a nanostructure pattern on an exterior surface thereof. At 26, the drum, while rotating about its central axis, imprints the nanostructure pattern (e.g., wobbled grooves or tracks) onto a liquid photopolymer layer on an outer surface of the optical tape. The various grooves or tracks have a corresponding width and length. While not shown, an embossing/curing station is also provided that includes a curing device that emits ultra-violet (UV) light onto the surface of the optical tape to cure the optical tape after the optical tape is passed through the drum.

At 28, at least one chemical coating/sputtering station may create or form a reflective layer (or phase change film, overcoat, topcoat, etc.) on the optical tape with desired optical characteristics that are needed for writing and reading data along with physical features for proper performance by focus and tracking servos (i.e., via various optical pickup units (OPUs)) during write or read operations of the data on the optical tape. At 30, a tension sensor/controller station is provided to maintain an appropriate tension in the optical tape as the optical tape moves longitudinally through the drum and the embossing/curing station. Further, at 30, a tape slitting station longitudinally slits or cuts the optical tape into a plurality of narrower sections of optical tape. Each of the plurality of narrower sections of the optical tape is rolled into cartridges. In view of the foregoing, the method 20 provides optical tape that is ready to have data written thereon and to have such data later read by various OPUs of the tracking servo system. The above process is described in greater detail in connection with U.S. Pat. No. 8,790,561 to Mahnad et al. which is incorporated by reference in its entirety.

FIG. 2 generally depicts a method 40 for producing an embossing drum 50 (see FIG. 3) that is used to imprint the series of nanostructures (or a nanostructure pattern) onto the optical tape. As noted above, the drum 50 is imprinted with a nanostructure pattern on an exterior (or outer) surface thereof. While the drum 50 rotates about a central axis, the drum 50 imprints the nanostructure pattern on the optical tape which forms wobbled grooves or tracks onto the surface of the optical tape. As generally shown at 40, a plurality of shims (e.g., 4) is produced. Each shim 42 (see FIGS. 3, 4, and 5) includes similar length and width dimensions and a similar corresponding nanostructure pattern is formed on an exterior surface thereof.

Referring to FIGS. 3 and 4, each of the four shims 42 is then typically precisely cut (so that the four shims when arranged in an end-to-end manner have a surface area substantially equal to those of the as yet formed outer surface of the drum) and appropriately shaped (e.g., via one or more rollers) to form a cylindrical or outer cylinder segment which forms a portion of the outer surface of the drum 50. The cylinder segments of shims 42 are then arranged end-to-end and welded together at four different seams to form the drum 50. As noted above, given for example that there are four shims 42 used to form the drum 50, a total of four weld operations are performed to couple the shims 42 together. A corresponding seam 52 (or weld seam) is present on the drum 50 after each welding operation is performed. FIGS. 3 and 4 also illustrate the nanostructure pattern 54 on the exterior surface of the drum 50. In general, the alignment of the shims 42 and corresponding welding operations to couple the shims 42 may be difficult to perform. Alignment of the shims to within 320 nm to provide for a track width for a seam area on the optical tape may be difficult to meet when the seams contact the optical tape during imprinting process. Typically, the fourth weld operation may be the most difficult of the welding operation. In general, the welds may obliterate 0.5 mm to 1.0 mm of the groove pattern on the nanostructure pattern 54.

FIG. 5 illustrates a shim 42 that includes a portion of the nanostructure pattern 54 (see 50). In one example, the length of the shim 42 may be 6 inches. As generally shown at 60, a 0.5 inch tape pattern is provided on an optical tape 62. The optical tape 62 as shown at 60 corresponds to a single portion of the optical tape 62 after the slitting operation is performed (see operation 38 above in connection with FIG. 1). The drum 50 embosses the nanostructure pattern 54 onto a surface of the optical tape 62 thereby leaving the track pattern of 0.5 inches in width. While not shown, it is recognized that several 0.5 inch wide track patterns exist on the embossing shim 42 and that several copies (i.e., widths) of 0.5 inch track patterns are embossed on a wide (6 inch, generally, but wider is possible) roll of base film which, after the coating process, is slit into multiple strands of 0.5 inch wide tape. A track pattern is generally defined as a total of all of the tracks on the optical tape 62. As generally shown at 64, the drum 50 embosses the nanostructure pattern 54 onto the optical tape 62 whereby a width for each track (or the track pitch) of the optical tape 62 is approximately 320 nm. The optical tape 62 includes seam areas 84a, 84b and a read/write data area 86. The seam areas 84a, 84b (or 84) generally correspond to locations on the optical tape 62 where the weld seam 52 of the drum 50 (e.g., the welded contact area between two adjacent shims 42) applies or embosses the nanostructure pattern 54 onto the optical tape 62. The weld seams 52 are imprinted across the width of the optical tape 62 at regular intervals equal to the length of each shim 42.

In general, while reading data from the optical tape 62, the data to be read is stored on the read/write data area 86 of the optical tape 62. In addition, during the writing operation, data is written on the read/write data area 86. The seam areas 84a, 84b on the optical tape 62 do not store (or record) data, thus data is not read therefrom. Thus, in this regard, the tracks 113a-113n are non-writeable. As noted above, the rational for this aspect is that it may be difficult to keep the shims 42 aligned to provide a track width of 320 nm on the optical tape 62 due to shim alignment and welding operations. Thus, it is not ideal to store or write data on the pre-seam area 84a and the post-seam area 84b. However, as shown in FIG. 5, the width for each track (or the track pitch) for the seam areas 84a, 84b is also 320 nm. The relevance of this aspect will be discussed in more detail below. As generally shown at 66, the width of each track on the optical tape 62 is formed by a single grooved portion 82 plus a single non-grooved portion 84 that is positioned directly adjacent to the single grooved portion 82. In one example, an overall depth for a single grooved portion 82 is 35 nm.

FIG. 6 depicts a drum 100 and optical tape 62 in accordance to one embodiment of the present invention. A plurality of shims 102 is welded together to form the drum 100 in the manner set forth above. As set forth above, a corresponding seam 104 (or weld seam) is present on the drum 100 after each welding operation is performed. The drum 100 further includes a nanostructure pattern 106 for imprinting a liquid photopolymer layer on the optical tape 62. The optical tape 62 includes the seam areas 84a, 84b and the read/write data area 86. The read/write data area 86 includes a plurality of tracks (or plurality of writeable tracks) 112a-112n (or 112). The seam areas 84a, 84b (or pre/post seam area 84) each also include a plurality of tracks (or plurality of non-writeable tracks) 113a-113n (or 113). In this embodiment, the nanostructure pattern 106 is configured to provide a larger width for each track 113a-113n in the seam areas 84a, 84b than the width provided for each track 112a-112n in the read/write data area 86. In one example, the width for each track 113a-113n in the seam areas 84a, 84b may be approximately (or equal to) 640 nm. It is recognized that nanostructure pattern 106 may be arranged to provide any width for each track 113a-113n so long as such a width is greater than width of each track 112a-112n for the read/write data area 86. However, it is recognized that the width for each track 113a-113n in the seam areas 84a, 84b may not exceed the practical limit of approximately 900 nm.

FIG. 7 depicts a more detailed view of the optical tape 62 including corresponding track widths in the seam areas 84a, 84b that are greater than corresponding track widths in the read/write data area 86. As shown, the width for each track 113a-113n in the seam areas 84a, 84b is 640 nm while the width for each track 112a-112n in the read/write data area 86 is 320 nm. Element 104 as depicted in FIG. 7 is provided to illustrate where the seams of the drum 100 left a corresponding seam area 84a, 84b during the imprinting operation. As noted above, the seam areas 84a, 84b are imprinted across the width of the optical tape 62 at regular intervals equal to the length of each shim 102. The overall length for seam areas 84a, 84b may be, for example, 5 mm which may exceed the length of the seam 104 on the drum 100. As shown in FIG. 7, the overall length of the read/write data area 86 is generally equal to 100 mm.

In general, a tracking servo system 110 is configured to read data from the various tracks 112a-112n within the read/write data area 86. The tracking servo system 110 includes lens (not shown) for reading data from the tracks 112a-112n during a read operation. During the read operation, the tracking servo system 110 moves vertically (e.g., up to down or down to up) along the tracks 112a-112n to read the data from the optical tape 62. A tape transport system 115 moves the optical tape 62 horizontally while the tracking servo system 110 moves vertically (e.g., in the negative y-axis) to read the data from the optical tape 62. Although, unintended, some vertical tape and track motion is unavoidable. The tracking servo system 110 is generally configured to maintain a laser spot that is "locked" in a center of the track 112 for proper read and write functions while the optical tape 62 moves continuously in the horizontal direction (or in either direction in the x-direction). As noted above, vertical tape or track motion is generally undesirable but unavoidable. Such undesirable lateral track motion is due to a combination of dynamic lateral tape motion ("LTM") and a groove pattern wander ("GPW") as imprinted on the optical tape 62. The tracking servo system 110 is generally configured to account for the relative lateral motions and to stay locked on the tracks 112 of the optical tape 62 to within a percentage of the 320 nm track pitch. In general, the times in which the tracking servo system 110 may cross the tracks 112a-112n is if the tracking servo system 110 experiences a failure or if the tracking servo system 110 is purposely seeking for a different track 112 during the read or write operations. As noted above, there is no data recorded to the seam areas 84a, 84b; thus the tracking servo system 110 is configured to jump over the seam areas 84a, 84b and lock onto the tracks 112 of a next read/write data area 86 as the optical tape 62 advances in the x-direction during either a read or write operation. However, the tracking servo system 110 is required to lock onto a track 113 of the seam areas 84a, 84b so that the tracking servo system 110 can anticipate and detect the next read/write data area 86 as the optical tape 62 advances. The increased width of the tracks 113a-113n in the seam areas 84a, 84b enable the tracking servo system 110 to robustly detect the seam areas 84a, 84b and thus locate the next read/write area 86.

FIG. 8A generally illustrates the tracking servo system 110 moving over a pre/post seam area 84a or 84b (or "84") of the optical tape 62 when the track width for each of the tracks 113a-113n in the seam area 84 is 320 nm as set forth in reference to FIG. 5. While not shown, the width for each track 112a-112n in the read/write data area 86 is also 320 nm. The tracking servo system 110 locks on to the first track 113a of the seam area 84 as the tracking servo system 110 moves past the seam area 84 to advance to a next read/write data area 86 during a read or write operation. Ideally, the tracking servo system 110 stays locked onto the first track 113a of the seam area 84 as the tape 62 advances in the positive x-direction. It is recognized that the tape 62 may also advance in the negative x-direction. However, as shown, the tracking servo system 110 loses lock on the track 113a and skates over two tracks until the tracking servo system 110 locks onto the track 113n (see laser spot 114 on track 113n). It is recognized that the tracking servo system 110 may skate over (or lose) any number of tracks 113. It is also possible that that the tracking servo system 110 may not re-acquire any tracks 113 in the seam area 84 after losing lock on a track 113 which may make it difficult to lock onto any one of the tracks 112 in the next read/write data area 86 once the tape 62 passes the seam area 84. It is generally desirable for the tracking servo system 110 to lock onto a track 113 (once lost) before the tape 62 advances to, or reaches the next read/write data area 86. Once the tracking servo system 110 locks onto the track 112 in the next read/write data area 86, the tracking servo system 110 reads a track address embedded in a wobble signal and either continues with the read or write function if the tracking servo system 110 is on the correct track or seeks to find the correct track 112.

FIG. 8B illustrates that the frequency of the tracking error signal is 3 kHz when the track pitch for the tracks 113 in the seam area 84 is 320 nm. Generally, there is a limit of 5 kHz for the tracking error signal in this situation. If the limit is exceeded, then the tracking servo system 110 may be at risk of losing control and "skating" over a large number of tracks 112. When this condition occurs, the tracking servo system 110 may go through an undesirable, time consuming re-acquire process before the tracking servo system 110 is able to return to the reading of writing process. The tracking servo system 110 includes circuitry for sensing the position of the laser beam 114 on the various tracks 113a-113n. Such circuitry provides the tracking error signal which corresponds to an error in the position of the laser beam 114 on the tracks 113a-113n. In addition, the tracking error signal may indicate when the various tracks 113a-113n are being crossed by the laser beam 114 of the tracking servo system 110.

FIG. 9A generally illustrates the tracking servo system 110 moving over the pre/post seam area 84a or 84b (or "84") of the optical tape 62 when the track width for each of the tracks 113a-113n in the seam area 84 is 640 nm as discussed in reference to FIG. 6. Due to the increased width for each track 113 in the seam area 84, this condition enables the tracking servo system 110 to lock onto a corresponding track 113 in the seam area 84 in the event the tracking servo system 110 loses lock on a track 113. The tracking servo system 110 locks on the first track 113a of the seam area 84 as the tracking servo system moves past the seam area 84 to advance to a next read/write data area 86 during a read or write operation. As shown, the tracking servo system 110 loses lock on the track 113a and then locks onto the track 113n due to the increased track pitch (or width) of the tracks 113 in the seam area 84 prior to reaching the read/write data area 86. The increased track pitch for each track 113 in the seam area 84 may minimize the issue of skating as discussed above in connection with FIG. 8A. It is recognized that the track pitch for each track 113 in the seam area 84 may be greater than 320 nm and less than the practical limit of 900 nm. The illustration in FIG. 9A is not intended to provide that the tracking servo system 110 is arranged to lock on to a next track 113 on every instance after it loses lock on a previously locked track. This may or may not occur. However, the increased track pitch will aid in assisting the tracking servo system 110 to lock onto a another track 113 in the seam area 84 prior to advancing to the next read/write data area 86 to minimize the effect of completely skipping any the tracks 113 in the seam area 84. Thus, the example as illustrated in FIG. 9A may provide for the tracking servo system 110 to move over a smaller number of tracks 113 (or lose a smaller number of tracks 113 in the seam area 113) when compared to the implementation as shown in FIG. 8A.

The increased track width for each track 113 to 640 nm may provide for a decrease in the corresponding frequency of the tracking error signal (e.g., 1.5 kHz) as shown in FIG. 9B and also provide for an increase in the amplitude of the tracking error signal.). It can be seen that by increasing the width of each track from 320 nm to 640 nm (i.e., doubling the width of the track 113a-113n), a corresponding reduction in the frequency of the tracking error signal is attained by 50%. Thus, the increased size of the width for each track 113 in the seam area 84 generally provides a large target for the tracking servo system 110 to lock onto or to detect as the tracking servo system 110 advances over the seam area 84 and onto to a next read/write data area 86.

While embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An optical data storage tape comprising:
   a first read/write data area including a first plurality of tracks for storing data, each track, in the first plurality of tracks, having a first track width;
   a pre-seam area positioned between the first read/write data area and a seam, the pre-seam area including a second plurality of tracks, wherein at least one of the second plurality of tracks has a second track width greater than the first track width;
   the seam;
   a post-seam area positioned between the seam and a second read/write data area, the post-seam area including a third plurality of tracks, wherein at least one of the third plurality of tracks has a third track width that is greater than the first track width;
   the second read/write data area including a fourth plurality of tracks for storing data.

2. The optical data storage tape of claim 1 wherein the second track width is approximately twice the size of the first track width.

3. The optical data storage tape of claim 1 wherein the second track width is more than 50% greater than the first track width.

4. The optical data storage tape of claim 1 wherein each of the second plurality of tracks have a wider width than each of the first plurality of tracks.

5. The optical data storage tape of claim 1 wherein the seam corresponds to a seam joint that joins at least two shims on an embossing drum that imprints a nanostructure pattern onto a layer of the optical data storage tape.

6. The optical data storage tape of claim 1 wherein each of the fourth plurality of tracks continue a respective track of the first plurality of tracks.

7. An apparatus comprising:
   an embosser drum having a joint and configured to imprint a nanostructure pattern onto an exterior of an optical data storage tape that forms:
      a first read/write data area including a first plurality of tracks for storing data, each track, in the first plurality of tracks, having a first track width;

a pre-seam area positioned between the first read/write data area and a seam, the pre-seam area including a second plurality of tracks, wherein at least one of the second plurality of tracks has a second track width greater than the first track width;

the seam corresponding to the joint;

a post-seam area positioned between the seam and a second read/write data area, the post-seam area including a third plurality of tracks, wherein at least one of the third plurality of tracks has a third track width that is greater than the first track width;

the second read/write data area including a fourth plurality of tracks for storing data.

8. The apparatus of claim 7 wherein the second track width is at least twice the width of the first track width.

9. The apparatus of claim 7 wherein the embosser drum further includes at least two shims that form the joint, wherein the joint and at least a portion of the nanostructure pattern forms the seam, the pre-seam area, and the post-seam area on the optical data storage tape.

10. A tracking servo system comprising:

a hardware processor;

the tracking servo system configured to perform operations comprising:

reading data from a track in a first plurality of tracks in a first read/write data area, the first plurality of tracks, having a first track width;

detecting a pre-seam area positioned between the first read/write data area and a seam, the pre-seam area including a second plurality of tracks, wherein at least one of the second plurality of tracks has a second track width greater than the first track width;

locking on to a track in a post-seam area positioned between the seam and a second read/write data area, the post-seam area including a third plurality of tracks, wherein at least one of the third plurality of tracks has a third track width that is greater than the first track width;

reading data from a track in a fourth plurality of tracks in the second read/write data area, the second read/write data area including a fourth plurality of tracks for storing data.

* * * * *

UNITED STATES PATENT AND TRADEMARK OFFICE
CERTIFICATE OF CORRECTION

PATENT NO. : 9,916,852 B2
APPLICATION NO. : 15/183036
DATED : March 13, 2018
INVENTOR(S) : Wang et al.

Page 1 of 1

It is certified that error appears in the above-identified patent and that said Letters Patent is hereby corrected as shown below:

In the Specification

In Column 7, Line 6, delete "that that" and insert -- that --, therefor.

Signed and Sealed this
Sixteenth Day of October, 2018

Andrei Iancu
*Director of the United States Patent and Trademark Office*